July 28, 1953 — R. W. BROWN — 2,646,948
AIRCRAFT UNDERCARRIAGE
Original Filed Feb. 18, 1947 — 2 Sheets-Sheet 1
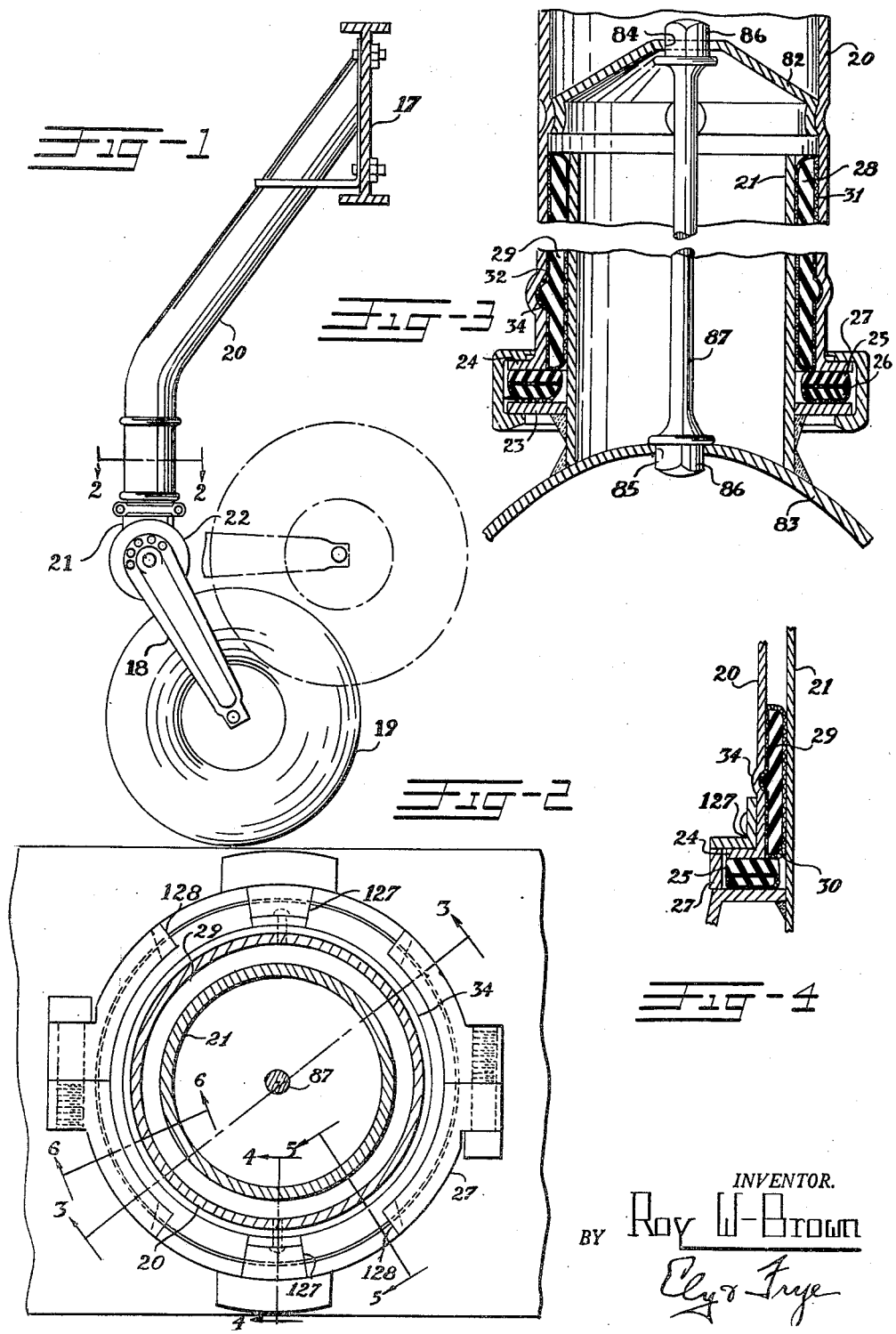
INVENTOR.
BY Roy W. Brown INVENTOR.
BY Roy W-Brown Patented July 28, 1953

2,646,948

UNITED STATES PATENT OFFICE 2,646,948

AIRCRAFT UNDERCARRIAGE

Roy W. Brown, Akron, Ohio, assignor to The Firestone Tire & Rubber Company, Akron, Ohio, a corporation of Ohio Original application February 18, 1947, Serial No. 731,590, now Patent No. 2,581,935. Divided and this application October 20, 1951, Serial No. 260,417

8 Claims. (Cl. 244—103)

This invention relates to aircraft undercarriage especially adapted for cross-wind landings.

One of the problems to be considered in the design and development of small, privately owned aircraft is the lack of adequate landing strips to permit safe landings under all wind conditions. It is quite desirable to have the aircraft adapted for cross wind landings so that only a minimum of landing strips and areas will be required to permit the aircraft to land regardless of the prevailing wind conditions.

While attempts have been made to provide aircraft with undercarriages that facilitate cross-wind landings, such equipment has been too heavy, or quite costly, or has been otherwise objectionable.

The general object of this invention is to avoid and overcome the foregoing and other disadvantages of previous types of aircraft undercarriages and to provide an aircraft undercarriage characterized by its ability to effect controlled swivelling of one or more of the landing wheels during cross-wind landings.

Still another object is to provide resilient torsional restraint of a swivelled landing wheel for aircraft.

Another object of the invention is to limit the amount of swivelling movement of a landing wheel relatively to the aircraft structure.

A further object of the invention is to provide an aircraft undercarriage which requires a minimum of maintenance and is adapted for long service life.

Another object of the invention is to provide an aircraft undercarriage comprising a landing wheel which may be torsionally deflected to guide the aircraft and which will return to a neutral position automatically when the torsional force thereon is removed.

Another object is to provide an improved rubber torsion member.

The foregoing and other objects of the invention will be made apparent as the specification proceeds.

Reference now is made to the accompanying drawings, wherein:

Fig. 1 is an elevation of an aircraft undercarriage embodying the invention;

Fig. 2 is an enlarged horizontal section taken on line 2—2 of Fig. 1;

Fig. 3 is a vertical section taken on line 3—3 of Fig. 2;

Figure 5:
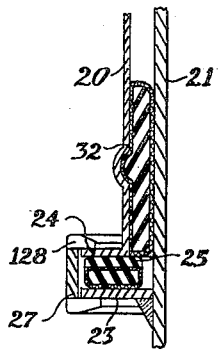
Figure 6:
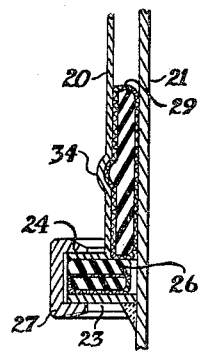
Figure 8:
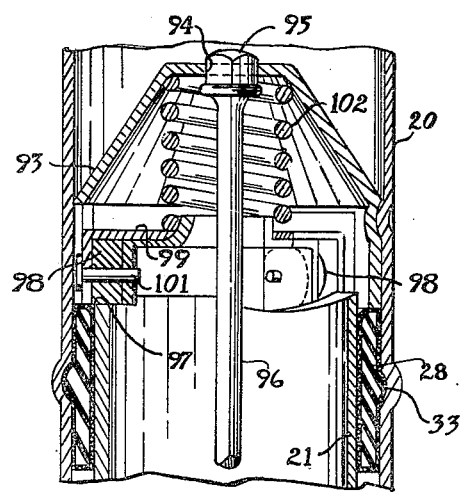
Figure 7:
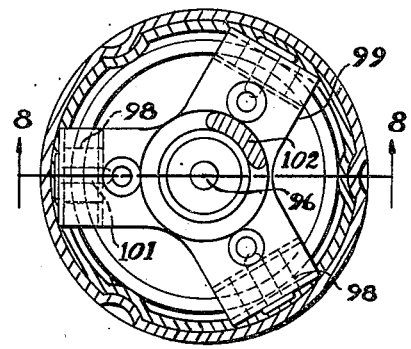

Figs. 4, 5 and 6 are fragmentary vertical sections taken on lines 4—4, 5—5 and 6—6 of Fig. 2;

Fig. 7 is an enlarged sectional view taken on line 2—2 of Fig. 1 but showing another embodiment of the invention; and Fig. 8 is a fragmentary vertical section taken on line 8—8 of Fig. 7.

Now referring in detail to the structure shown in the drawings, a support member 20, usually tubular in form, is provided, which member is made from any suitable material and is adapted to engage in a conventional manner with a support plate 17 of an aircraft for support of same when not in the air. Member 20 is adapted to slidably receive cylindrical member 21, the lower end of which carries a torsion member 22 to provide pivotal mounting for a pair of fork arms between which a pneumatic tire and wheel assembly 19 is journalled.

Vertical load is transmitted between member 20 and cylinder 21 by means of a radially extending flange 23, suitably secured, as by welding, to cylinder 21. A flange 24 is usually formed on the lower end of the member 20 and a suitable annular thrust bearing 25 is positioned intermediate flange 23 and flange 24. Thrust bearing 25 may be of any suitable construction and, in this instance, is shown as comprising a rubber member having a friction material coating 26 on its lower surface, or extending through the body of the member 25, as shown, to divide the bearing, if desired. The friction material coating 26 has the unusual property of greater kinetic friction than static friction and it is made from fabric which is impregnated with castor oil, a wax compatible with the oil, and aluminum soap. Graphite also may be present in the impregnating composition, which is thixotropic. A conventional split clamp ring 27 is provided to engage with the outer surfaces of the flanges 23 and 24 to limit axial movement between members 20 and 21 while permitting rotation therebetween.

In order to retain the telescoped portions of the members 20 and 21 in concentric alignment, suitable bearings 28 and 29 are positioned within the cylindrical space therebetween. The bushings 28 and 29 are constrained against axial movement by metal backing plates 31 and 32, respectively, integrally bonded thereto, and expanded to form an annular rib at 33 and 34, respectively, said ribs being complementally engaged in suitable channels provided in member 20 by crimping. Ribs 33 and 34 may be replaced by a series of circumferentially spaced expanded areas, if desired. Friction material 30, similar to the friction material 26, may be integrally bonded to the radially inner surfaces of the bushings 28 and 29, as shown in Fig. 3.

A bridge member 82 and the plate 83 have non-circular apertures 84 and 85 formed therein complementally to receive ends 86 of a torsion bar 87 positioned by the bridge plate 82 and plate 83 and extending therebetween. Torsion bar 87, of suitable metal, is adapted to resist, resiliently, relative rotational movement between the members 20 and 21 and to realign such members upon removal of a distorting force.

In order to limit the amount of relative arcuate movement of the pneumatic tire and wheel assembly 19, associated with cylinder 21, stop or motion limiting means may be provided. In Figs. 2, 4, 5 and 6 there is shown one embodiment of means for limiting rotational or castering movement of the undercarriage wheel disclosed herein. A stop lug 127, finding its support in member 20, is positioned immediately above flange 24 to depend therefrom, the lower margin thereof extending into a cut-out section 128 of clamp 27, as shown in Fig. 2. The split clamp 27 preferably has two such cut-out sections 128, diametrically opposed and each adapted to receive a stop lug. The remainder of the C-clamp 27 is continuous around each semi-circular portion of member 20 for retention of flanges 23 and 24 and bearing 25 in unitary assembly. Stop lugs 127 abut the end margins of cut-out sections 128 to limit wheel castering in each direction. Cut-out sections 128 are of preselected length to control the desired limit of castering. More than one set of cut-out sections may be provided in the same assembly to provide universal application of the undercarriage unit.

The construction described hereinabove provides a compact, sturdy, effective means for permitting wheel castering in aircraft undercarriage while simultaneously damping such castering to prevent wheel "shimmy" or yaw. Controlled castering enables the aircraft to be safely landed at greater angles to the prevailing wind than can be safely effected with previous undercarriages. Upon landing, initial ground contact of the wheels automatically aligns the wheels in the direction of forward motion of the airplane and this is true even though the airplane approaches the runway in a side-slip, due to the well-known characteristic of a caster to automatically align a wheel in the direction of vehicle movement, with the wheel axis "tailing" the vertical caster pintle.

The invention uses a minimum of parts and comprises an aircraft mounted cylinder 20 and a wheel carrying cylinder 21 in telescoped relation therewith. Said cylinders are held in spaced concentric alignment by an annular friction or torsion member 1 of the type set out and described in detail in my prior Patent 2,581,935 dated January 8, 1952 of which this application is a division. Reference is made to said patent for a detailed description of the character of said member 1. The cylinders 20 and 21 are, in general, secured together and associated for relative rotational movement and load transmittal as in the embodiments of the invention described in my said patent. In this instance, a bridge member 82 is secured within the cylinder 20 and a support plate 83 is secured to the cylinder 21. The bridge member 82 and the plate 83 have non-circular apertures 84 and 85 formed therein complementally to receive ends 86 of a torsion bar 87 positioned by the bridge plate 82 and plate 83 and extending therebetween. Torsion bar 87, of suitable metal is adapted to resist, resiliently, relative rotational movement between the members 20 and 21 and to realign such members upon removal of a distorting force.

A modification of the invention embodying use of a torsion bar is shown in Figs. 7 and 8. In this embodiment, cylinder 21 extends into tubular member 20 and is mounted therein for slight arcuate movement with relation to the member 20 in any conventional manner. An annular bushing 28 is disposed between members 21 and 20 and functions as a bearing to keep these members in concentric alignment. Bushing 28 is of the same character as bushing 29 referred to in the discussion above relative to Fig. 2. A bridge member 93 is positioned in and secured to the cylinder 20 and such bridge member 93 has an aperture 94 therein which engages with head 95 of a torsion member 96, the other end of which engages with a member (not shown) associated with the cylinder 21 as shown in Figure 13. The upper or inner end of the cylinder 21 has a plurality of cam surfaces or recesses 97 of any desired shape and spaced circumferentially. Cam surfaces 97 are adapted to engage with rollers 98, which are mounted on a yoke member 99, by pins 101. Fig. 15 best shows that the cam surfaces 97 are substantially symmetrically formed and have one maximum recessed or cut-out portion which gradually slopes up to the end of the cylinder 21. The rollers 98 normally are positioned at the bottom of the cam surfaces 97. To insure the requirement of substantial force for movement of the cams up the cam surfaces 97 to the intrevening flat, a relatively heavy coil spring 102 is compressably retained between bridge member 93 and the yoke 99. Hence in this embodiment of the invention, relative rotational movement between the cylinder 21 and the tubular member 20 is resisted both by torsional forces set up in the torsion bar 96 and by the force required to compress spring 102 the axial depth of cam 97. In this instance, the cams and their associated means function as spring loaded detents that aid in centering the supported member 21 with relation to the support member 20 and in resiliently resisting relative rotational motion therebetween due to wheel castering. Energy stored in the spring 102 and torsion member 96 aids in returning the members 21 and 20 to their neutral positions, upon release of wheel torque.

In the embodiments of the invention disclosed herein, any conventional material may be used in forming the aircraft undercarriage, the resilient or rubber-like bushings 1 and 2 used in the invention, the torsion bars, etc. The illustrated embodiments are particularly adapted to light weight but sturdy constructions. The advantages above enumerated for landing operations are equally applicable to take-off operations, since the undercarriage described herein enables an aircraft to move on the ground with the longitudinal axis of the plane at an acute angle with the direction of ground motion. The carriage will function automatically as above stated to assume the proper wheel direction immediately upon ground contact during landing, regardless of whether the airplane is in straight flight or in a side slip, and the wheels will gradually return to normal or "centered" positions as the aircraft speed falls below the "stall" speed thereof.

In accordance with the patent statutes, one complete embodiment of the invention has been illustrated and described in detail but the invention is not limited to the specific examples set forth since modification may be resorted to within the scope of the appended claims.

What is claimed is:

1. In an aircraft undercarriage, two generally cylindrical support members of unequal diameter positioned in telescoped relation, a torsion bar positioned along the axis of said support members with one end secured to one of said support members and the other end secured to the second support members, a bridge member secured within the larger of said support members and engaging an end of said torsion bar, a dished cam surface formed on the axially inner end of the smaller of said support members, a cam roller floatably mounted within said larger cylinder and engaged with said cam, and spring means compressively retained between the bridge member and cam continuously to urge said cam roller into engagement with said cam surface, whereby rotational movement of one cylindrical member in respect to the other moves said cam roller along the dished surface to effect axial displacement of said roller and compress or release tension on said spring.

2. In an aircraft undercarriage, two relatively rotatable members positioned in concentrically spaced telescoped relation, one of said members being adapted to engage with an aircraft and the other of said members being adapted to carry an aircraft wheel, an elongate metallic connecting element, means securing one end portion of said connecting element to one of said telescoped members, and means securing the second end portion of said connecting element to the other element, and an annular friction element interposed between said members, said element having a greater dynamic than static coefficient of friction, whereby relative rotational movement between said telescoped members is resiliently resisted by both said connecting element and said friction element.

3. An aircraft undercarriage as in claim 2, wherein the means securing one of the rotatable members to the connecting element permits relative axial movement while preventing rotational movement therebetween.

4. An aircraft undercarriage as in claim 2, wherein means are provided for limiting the amount of relative rotational movement between the telescoped members.

5. An undercarriage as in claim 2 wherein a stop lug is secured to one telescoped member and a stop member is associated with the other of said telescoped members to limit relative rotational movement therebetween.

6. In an aircraft undercarriage, two generally cylindrical support members of unequal diameters positioned in telescoped relation, at least one resilient support member interposed axially between the cylindrical support members, a torsion bar passing through said resilient support and being along the axis of said cylindrical members with one end secured to one and the other end to the other cylindrical support member, a cam surface associated with an end of one of the cylindrical support members, a cam follower associated with the other cylindrical support and being adapted to cooperate with said cam surface, whereby rotational movement of one cylindrical member in respect to the other moves the cam against or away from the cam surface and effects relative axial movement of the cylindrical supports and increases or releases tension in said resilient member.

7. In an aircraft wheel mounting, two relatively rotatable members positioned in telescoped relation, a torsion member in the form of a rigid rod, a bridge member secured to one of said members and engaging an end of said torsion rod, and means associated with the other of said support members for engaging the second end of said torsion rod whereby relative rotational movement of said telescoped members is torsionally resisted by said rod.

8. In an aircraft wheel mounting, two relatively rotatable tubular support members positioned in telescoped relation, a connecting torsion rod, means securing one end of said connecting rod to one of said members, and means securing a second portion of said connecting rod to the other member whereby relative rotational movement of said telescoped members is torsionally resisted by said connecting member.

ROY W. BROWN.

References Cited in the file of this patent
UNITED STATES PATENTS

| Number | Name | Date |
|---|---|---|
| 395,147 | Jeffery | Dec. 25, 1888 |
| 2,472,415 | Geisse | June 7, 1949 |
| 2,581,935 | Brown | Jan. 8, 1952 |